US011138036B2

United States Patent
Denis et al.

(10) Patent No.: US 11,138,036 B2
(45) Date of Patent: Oct. 5, 2021

(54) ARBITRATION DEVICE

(71) Applicants: STMicroelectronics SA, Montrouge (FR); STMicroelectronics (Grenoble 2) SAS, Grenoble (FR)

(72) Inventors: Bruno Denis, Saint Nazaire les Eymes (FR); Christophe Taba, Echirolles (FR)

(73) Assignees: STMicroelectronics SA, Montrouge (FR); STMicroelectronics (Grenoble 2) SAS, Grenoble (FR)

( * ) Notice: Subject to any disclaimer, the term of this patent is extended or adjusted under 35 U.S.C. 154(b) by 20 days.

(21) Appl. No.: 16/739,388

(22) Filed: Jan. 10, 2020

(65) Prior Publication Data

US 2020/0225986 A1 Jul. 16, 2020

(30) Foreign Application Priority Data

Jan. 16, 2019 (FR) .................................... 1900377

(51) Int. Cl.
| | | |
|---|---|---|
| *G06F 9/48* | (2006.01) | |
| *G06F 9/54* | (2006.01) | |
| *G06F 12/1081* | (2016.01) | |
| *G06F 13/364* | (2006.01) | |
| *G06F 13/16* | (2006.01) | |
| *G06F 13/30* | (2006.01) | |
| *G06F 13/40* | (2006.01) | |

(52) U.S. Cl.
CPC .......... *G06F 9/4881* (2013.01); *G06F 9/4818* (2013.01); *G06F 9/542* (2013.01); *G06F 9/546* (2013.01); *G06F 12/1081* (2013.01)

(58) Field of Classification Search
CPC ................................ G06F 9/4881; G06F 9/542
See application file for complete search history.

(56) References Cited

U.S. PATENT DOCUMENTS

| | | | | |
|---|---|---|---|---|
| 5,265,207 | A * | 11/1993 | Zak | G06F 11/08 370/408 |
| 5,832,278 | A | 11/1998 | Pham | |
| 5,870,560 | A * | 2/1999 | Zulian | G06F 13/364 709/225 |
| 7,143,219 | B1 | 11/2006 | Chaudhari et al. | |
| 2003/0229742 | A1* | 12/2003 | Moss | G06F 13/364 710/111 |
| 2012/0311214 | A1* | 12/2012 | Lin | G06F 13/1663 710/244 |
| 2018/0165199 | A1* | 6/2018 | Brandt | G06F 12/0831 |

FOREIGN PATENT DOCUMENTS

KR 20030057594 A 7/2003

OTHER PUBLICATIONS

INPI Search Report and Written Opinion for FR 1900377 dated Oct. 16, 2019 (8 pages).

* cited by examiner

*Primary Examiner* — Getente A Yimer
(74) *Attorney, Agent, or Firm* — Crowe & Dunlevy

(57) ABSTRACT

Requests are received by a routing circuit. A plurality of first round-robin arbitration circuits are coupled to the routing circuit. There are as many first round-robin arbitration circuits as there are possible priority levels for the requests. The routing circuit operates to transmit each received request to a number of first round-robin arbitration circuits determined according to the priority level of the request. A second round-robin arbitration circuit has inputs respectively connected to the outputs of the first round-robin arbitration circuits.

22 Claims, 3 Drawing Sheets

ARBITRATION DEVICE

PRIORITY CLAIM

This application claims the priority benefit of French Application for Patent No. 1900377, filed on Jan. 16, 2019, the content of which is hereby incorporated by reference in its entirety to the maximum extent allowable by law.

TECHNICAL FIELD

The present disclosure generally concerns electronic circuits and, more specifically, arbitration devices provided in such electronic circuits.

BACKGROUND

Arbitration devices are known in the art which operate to select a request from among a plurality of received requests. The received requests each have a priority level which may differ from one request to the other. In such devices, the selection of the request is based on the priority levels of the received requests.

There is a need for a device which overcomes all or part of the disadvantages of known arbitration devices. More particularly, there is a need for an arbitration device which decreases, or even suppresses, the risk of a famine operation, that is, a situation where one request from among the plurality of received requests would never be selected.

There further is a need for an arbitration device which operates to select a request not only based on the priority levels of the received requests, but also based on the type of the request selected among a plurality of types, preferably among two types representative of the fact that the processing of the request should respectively be or not be performed in real time.

SUMMARY

An embodiment provides a device configured to receive requests, the device comprising: as many first round-robin arbitration circuits as there are possible priority levels for the requests; and a circuit configured to transmit each received request to a number of first round-robin arbitration circuits determined according to the priority level of the request.

According to an embodiment, the number of first round-robin arbitration circuits to which the circuit transmits each request increases with the priority level of the request.

According to an embodiment, for each request, the priority level of the request is represented by an integer in the range from 1 to a number of possible priority levels for the requests, said integer being all the higher as the priority of the request is high.

According to an embodiment, said circuit is configured to transmit each request to a number of first round-robin arbitration circuits equal to the integer representative of the priority level of the request.

According to an embodiment, said circuit is further configured to randomly select, for each request, the first round-robin arbitration circuit(s) to which the circuit transmits the request.

According to an embodiment, each first round-robin arbitration circuit is associated with a respective priority level among the possible priority levels, the circuit being further configured to transmit, to each first round-robin arbitration circuit, each request having a priority level greater than or equal to the priority level associated with the first round-robin arbitration circuit.

According to an embodiment, the device further comprises a second round-robin arbitration circuit having its inputs respectively connected to the outputs of the first round-robin arbitration circuits.

Another embodiment provides a system comprising: a device such as defined hereabove; a third round-robin arbitration circuit; a fourth fixed priority arbitration circuit having a first input connected to an output of the second round-robin arbitration circuit of said device and having a second input connected to an output of the third round-robin arbitration circuit; and a circuit configured to receive request each having a type selected among a first type and a second type, and to transmit the requests of the first type to the circuit of said device and requests of the second type to said third round-robin arbitration circuit, the circuit of the system for example comprising the circuit of said device.

According to an embodiment, when a request is present on each of the first and second inputs of the fourth fixed priority arbitration circuit, the fourth fixed priority arbitration circuit is configured to select the request present on its second input.

Another embodiment provides a system comprising: first and second devices such as defined hereabove; a third fixed priority arbitration circuit having a first input connected to an output of the second round-robin arbitration circuit of said first device and having a second input connected to an output of the second round-robin arbitration circuit of said second device; and a circuit configured to receive requests of a type selected among a first type and a second type, and to transmit requests of the first type to the circuit of said first device and requests of the second type to the circuit of said second device, the circuit of the system for example comprising the circuit of the first device and/or the circuit of the second device.

According to an embodiment, when a request is present on each of the first and second inputs of the third round-robin arbitration circuit, the third round-robin arbitration circuit is configured to select the request present on its second input.

According to an embodiment, the number of possible priority levels for requests of the first type is different from the number of possible priority levels for requests of the second type.

According to an embodiment, requests which do not require a real time processing are of the first type, the requests requiring a real time processing being of the second type.

Another embodiment provides an electronic circuit such as a microcontroller, a microprocessor, or a direct memory access circuit, comprising a device or a system such as defined hereabove.

Another embodiment provides a method comprising the successive steps of: receiving a plurality of requests having different priority levels; and transmitting, by means of a circuit, the requests to first round-robin arbitration circuits, the total number of first round-robin arbitration circuits being equal to the number of priority levels, the number of first round-robin arbitration circuits to which each request is transmitted being determined by the priority level of the request and preferably increasing with the priority level of the request.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
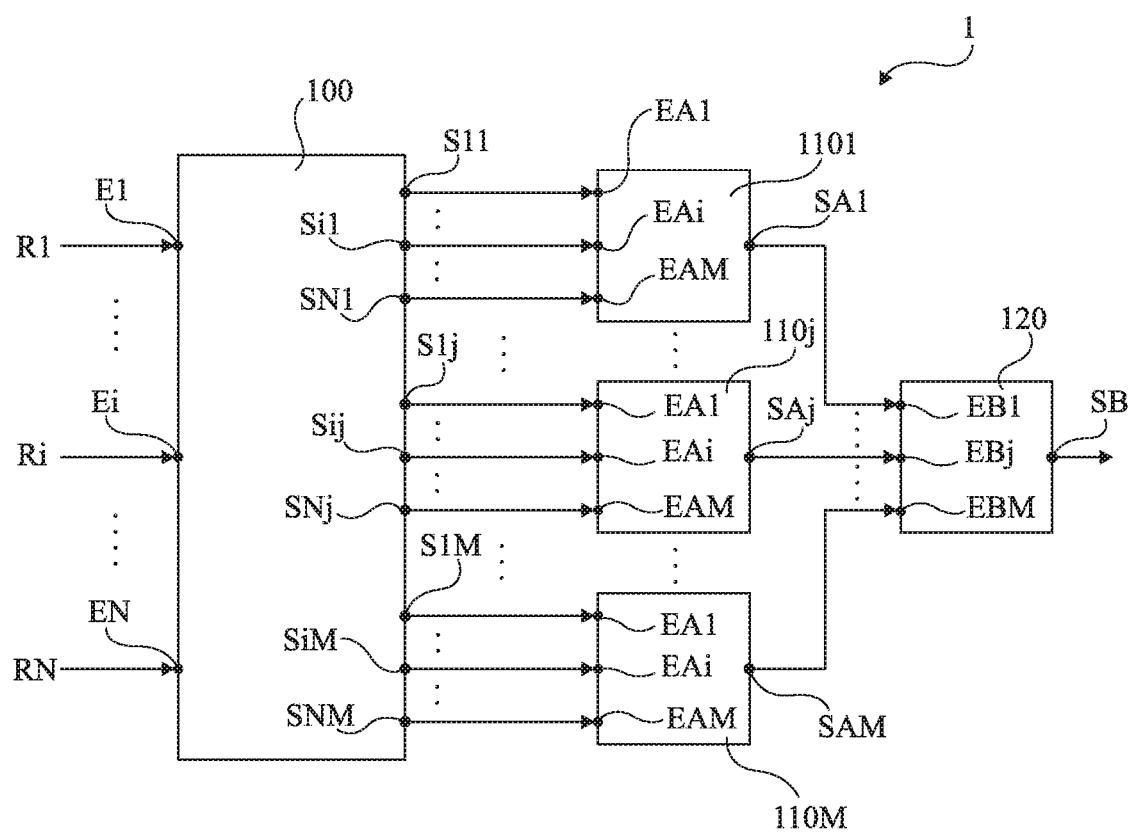
FIG. 1 schematically shows in the form of blocks an embodiment of an arbitration device.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the different signals and protocols defining a request have not been detailed, the described embodiments being compatibles with usual request signals and protocols. Further, the electronic circuits where an arbitration device is provided have not been detailed, the described embodiments being compatible with usual electronic circuits comprising an arbitration device. Finally, the operation and the various implementations of round-robin arbitration circuits and of fixed priority arbitration circuits have not been described, the described embodiments being compatible with the usual operation and usual implementations of such arbitration circuits.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 very schematically shows in the form of blocks an embodiment of an arbitration device 1.

Device 1 is here provided to simultaneously receive up to N requests Ri, i being an integer in the range from 1 to N and N being an integer greater than or equal to 2. Further, each request Ri has a priority level p, p being an integer in the range from 1 to M, the latter being an integer greater than or equal to 2. Each request Ri may take any priority level p in the range from 1 to M. It is here considered that the priority of a request is all the higher as its priority level is high. As an example, the priority level p of a request Ri is set by a device or circuit having transmitted the request.

Device 1 comprises a routing circuit 100. Circuit 100 is configured to simultaneously receive, if present, the N requests Ri. Circuit 100 thus comprises N inputs Ei, i being in the range from 1 to N, each input Ei being configured to receive a corresponding request Ri.

Device 1 further comprises M arbitration circuits 110j, j being an integer in the range from 1 to M. In other words, device 1 comprises as many arbitration circuits 110j as the number M of possible priority levels for requests Ri. Each arbitration circuit 110j is of round-robin type. Further, each arbitration circuit 110j comprises N inputs EAi, i being an integer in the range from 1 to N. In other words, each arbitration circuit 110j may simultaneously receive up to N requests. Each arbitration circuit 110j comprises an output SAj at the level of which the request selected by the arbitration circuit is available.

Circuit 100 is configured to transmit or distribute each request Ri of priority level p that it receives to p arbitration circuits among the M arbitration circuits 110j. More particularly, for each input Ei, circuit 100 comprises M corresponding outputs Sij, j being an integer in the range from 1 to M. For a given input Ei, the M corresponding outputs Sij are coupled, preferably connected, to inputs EAi of the respective arbitration circuits 110j. In other words, each output Sij is coupled, preferably connected, to input EAi of arbitration circuit 110j.

In this example, it is considered that, when a request Ri having a priority level p is received by circuit 100, circuit 100 transmits the request to the p arbitration circuits 1101, 1102, . . . , 110j, 110p-1, and 110p. In other words, each arbitration circuit 110j is associated with a different priority level p, in this example the level p equal to the index j of the considered arbitration circuit, and circuit 100 is configured to transmit to arbitration circuit 110j all the requests Ri having a priority level greater than or equal to j.

Device 1 further comprises an arbitration circuit 120. Arbitration circuit 120 is of round-robin type. Arbitration circuit 120 comprises as many inputs EBj as there are arbitration circuits 110j or, in other words, as there are possible priority levels for requests Ri. Each input EBj, j being an integer in the range from 1 to M, is coupled, preferably connected, to output SAj of arbitration circuit 110j. Thus, when an arbitration circuit 110j selects one of the requests available on its inputs EAi, the selected request is transmitted to input EBj of arbitration circuit 120, via output SAj of arbitration circuit 110j. Arbitration circuit 120 comprises an output SB at the level of which the request selected by arbitration circuit 120 is available. Output SB forms an output of device 1.

Although this is not shown herein, each arbitration circuit 110j, arbitration circuit 120, and circuit 100 preferably have an input configured to receive a synchronization signal, for example, a periodic synchronization signal, or clock signal, clk. In this case, a request on an input of circuit 120 or of one of arbitration circuits 110j and 120 is preferably taken into account during edges, for example, rising edges, of signal clk.

Further, although each request has been represented by a single wire in FIG. 1, in practice, the request may comprise a plurality of signals and thus be transmitted via a plurality of conductive wires. For example, the request may comprise a signal req over one bit transmitted over a corresponding conductive wire, a signal ack of acknowledgement of the request over one bit transmitted over a corresponding conductive wire, signal ack enabling to validate the request according to a given protocol, for example, a four-phase protocol or a protocol where a request is validated when signals ack and req are simultaneously active on an edge (rising and/or falling) of a synchronization signal, and a data signal over a plurality of bits transmitted over a plurality of corresponding conductive wires, the data signal particularly comprising information representative of the priority level of the request. As an example, when the request is a request corresponding to a data transfer, the data signal of the request for example comprises information representative of the source of the transfer, of the destination of the transfer, of the size and/or of the number of data words to be transferred, etc.

Device 1 operates as follows. When a request Ri is received by the corresponding input Ei of circuit 100, circuit 100 determines the priority level p of the request, for example, by means of information representative of level p comprised within the request itself. Circuit 100 then transmits request Ri to p arbitration circuits 110j, via p outputs Sij. This is implemented for each of the N inputs Ei capable of receiving a corresponding request Ri. Thus, each of the M arbitration circuits 110j is capable of receiving one or a plurality of requests from circuit 100. Each of the M arbitration circuits 110j having received one or a plurality of requests from circuit 100 implements a round-robin-type arbitration method and selects one of the requests present on its inputs EAi. The requests selected by the M arbitration circuits 110j are available at the level of the respective outputs SAj of the arbitration circuits, and are delivered to arbitration circuit 120. Arbitration circuit 120 then implements a round-robin type arbitration method and selects one of the requests present on its inputs EBi, the selected request being then available on output SB of arbitration circuit 120 and forming the request selected by arbitration device 1.

In device 1, when a plurality of requests Ri are simultaneously received by circuit 100, the higher the priority level p of a request, the larger the number p of arbitration circuits 110j to which the request is transmitted. As a result, the probability for a request to be selected by one or a plurality of arbitration circuits 110j, and then by arbitration circuit 120, increases with its priority level. Thus, the higher the priority level p of a request, the greater the probability for the request to be selected by device 1 increases.

Further, due to the fact that arbitration circuits 110j and 120 are of round-robin type and not of fixed priority type, when a plurality of requests Ri are simultaneously received by device 1, the probability for a request Ri having the lowest priority level to be selected by device 1 among all the received requests Ri is not zero. This enables to avoid the risk of a famine situation for the received requests having the lowest priority level.

As an example, the case where M is equal to 3 and where, among the requests Ri that device 1 receives at a given time, for example, a rising edge of signal clk, x requests have a priority level p equal to 1, y requests have a priority level p equal to 2, and z requests have a priority level p equal to 3, the sum of x, y, and z being smaller than or equal to N. In the example of FIG. 1, each of the x requests having a priority level p equal to 1 is transmitted to arbitration circuit 1101, each of the y requests having a priority level p equal to 2 being transmitted to each of arbitration circuits 1101 and 1102, and each of the z requests having a priority level p equal to 3 being transmitted to each of arbitration circuits 1101, 1102, and 1103. The following table provides, for this specific example, the probabilities for a request to be selected by device 1 according to the priority level of the request, in the following cases:

case 1: all the received requests have the same priority level p equal to 1 ($x>0$, $y=0$, and $z=0$);
case 2: all the received requests have the same priority level p equal to 2 ($x=0$, $y>0$, and $z=0$);
case 3: all the received requests have the same priority level p equal to 3 ($x=0$, $y=0$, and $z>0$);
case 4: none of the received requests has the priority level p equal to 1 ($x=0$, $y>0$, and $z>0$);
case 5: none of the received requests has the priority level p equal to 2 ($x>0$, $y=0$, and $z>0$);
case 6: none of the received requests has the priority level p equal to 3 ($x>0$, $y>0$, and $z=0$); and
case 7: requests with the three priority levels are received ($x>0$, $y>0$, and $z>0$). It should be noted that the probabilities indicated hereabove do not take into account the states of arbitration circuits 110j, that is, they do not take into account the possible last requests selected (served) by each of arbitration circuits 110j.

TABLE 1

| | p equal to 1 | p equal to 2 | p equal to 3 |
|---|---|---|---|
| Case 1 | $1/x$ | 0 | 0 |
| Case 2 | 0 | $1/y$ | 0 |
| Case 3 | 0 | 0 | $1/z$ |
| Case 4 | 0 | $2/(3*(y+z))$ | $1/(3*z) + 2/(3*(y+z))$ |
| Case 5 | $1/(3*(x+z))$ | 0 | $2/(3*z) + 1/(3*(x+z))$ |
| Case 6 | $1/(2*(x+y))$ | $1/(2*y) + 1/(2*(x+z))$ | 0 |
| Case 7 | $1/(3*(x+y+z))$ | $1/(3*(x+y+z)) + 1/(3*(y+z))$ | $1/(3*(x+y+z)) + 1/(3*(y+z)) + 1/(3*z)$ |

It can be observed in the above table that, when a plurality of requests are simultaneously received and the requests have different priority levels, the requests having the highest priority level have a higher probability of being selected by device 1 than requests having a lower priority level. Although the table has been obtained in the case of a specific example, the above results can be generalized to any pair of values M and N.

An embodiment where, on the one hand, each arbitration circuit 110j is associated with a given priority level p and, on the other hand, circuit 100 is configured to transmit to each arbitration circuit 110j all the requests having a priority level greater than or equal to the priority level to which this arbitration circuit 110j is associated, has been described hereabove.

As a variation, circuit 100 is configured to randomly select the p arbitration circuits 110j to which it transmits each received request of priority level p. This enables, when a first request and a second request, with a higher priority level than the first request, are simultaneously received by device 1, to decrease the interval between the probability for the first request to be selected by device 1 and the probability for the second request to be selected by device 1. This thus decreases risks of famine for requests having the lowest priority levels. However, the probability for the second request to be selected remains greater than the probability for the first request to be selected.

In certain applications, it is desirable to provide two different types of requests, for example, requests of a first type corresponding to requests which do not require a processing in real time, and requests of a second type corresponding to requests requiring a processing in real time, while providing for requests of one of the two types, the second type in the present example, to hold the priority over requests of the other one of the two types, the first type in the present example. An arbitration system or device enabling to answer this need will now be described in relation with FIG. 2.

Figure 2:
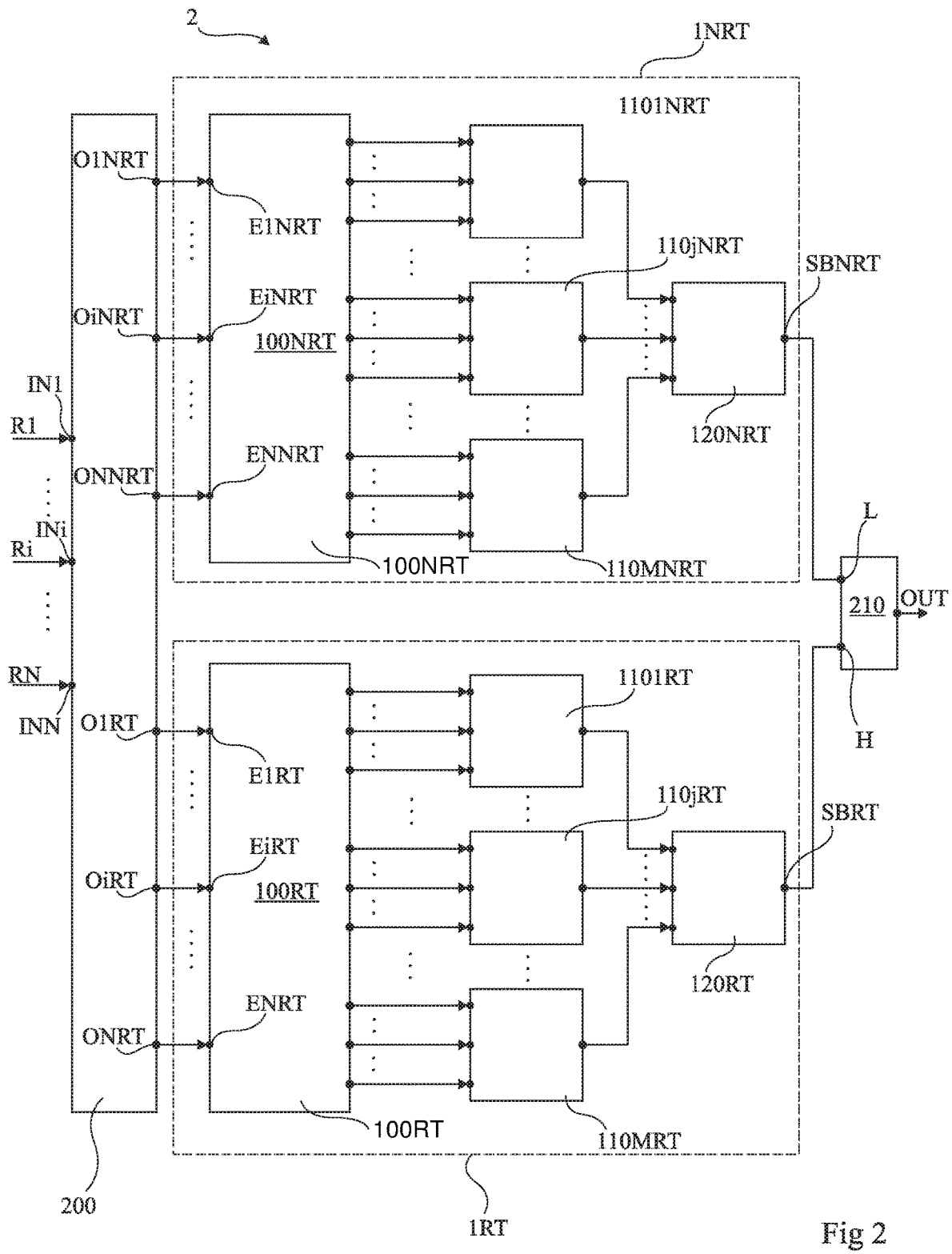
FIG. 2 schematically shows in the form of blocks an embodiment of a system comprising the device of FIG. 1.

FIG. 2 schematically shows in the form of blocks an embodiment of a system 2 comprising device 1, and more particularly, here, two devices 1.

System 2 may simultaneously receive up to N requests Ri. Each received request Ri may be of a first type, RT, or of a second type, NRT, the first type here holding the priority over the second type. For example, NRT-type requests correspond to requests requiring no real-time processing NRT—"Non Real Time"), RT-type requests corresponding to requests requiring a real-time processing (RT—"Real Time"). The RT or NRT type of a request is selected, or set, upstream of system 2, for example, by a circuit or device having transmitted the request. The RT or NRT type of a request is indicated in the request, for example, by information representative of the type of the request, the information being for example comprised within the data signal of the request itself.

Each NRT-type request has a priority level pNRT, pNRT being an integer in the range from 1 to an integer MNRT greater than or equal to 2. Further, in this embodiment, each RT-type request has a priority level pRT, pRT being an integer in the range from 1 to an integer MRT greater than or equal to 2. Integers MNRT and MRT may be different or equal.

A first one of the two devices 1 is configured to process NRT-type requests and is designated with reference 1NRT in FIG. 2, the second one of the two devices 1 being configured to process RT-type requests and being designated with reference 1RT in FIG. 2. Further, in FIG. 2, the references used to designate the various elements of device 1NRT, respectively 1RT, correspond to those used to designate the same elements in FIG. 1, to which letters NRT, respectively RT, have been appended.

System 2 further comprises a circuit 200. Circuit 200 comprises N inputs INi, each configured to receive a corresponding request Ri. Inputs INi of circuit 200 form inputs of system 2. For each input INi, circuit 200 comprises two outputs OiNRT and OiRT coupled, preferably connected, to the respective inputs EiNRT and EiRT of devices 1NRT and 1RT. When system 2 receives a request Ri of NRT type, circuit 200 is configured to transmit it, via its output OiNRT, to the corresponding input EiNRT of circuit 100NRT of device 1NRT. Similarly, when system 2 receives a request Ri of RT type, circuit 200 is configured to transmit it, via its output OiRT, to the corresponding input EiRT of circuit 100RT of device 1RT.

System 2 also comprises an arbitration circuit 210. Arbitration circuit 210 comprises an input L coupled, preferably connected, to output SBNRT of device 1NRT, that is, the output of arbitration circuit 120NRT, and an input H coupled, preferably connected, to output SBRT of device 1RT, that is, the output of arbitration circuit 120RT. Arbitration circuit 210 comprises an output OUT forming an output of system 2. Arbitration circuit 210 is of fixed priority type, that is, when two requests are simultaneously present on its inputs L and H, the arbitration circuit always selects the request present on its input with the highest priority. In this example, the arbitration circuit always selects the request present on its input H, which receives from device 1RT RT-type requests, which have a higher priority than the NRT requests received, from device 1NRT, by its input L.

In operation, when system 2 simultaneously receives a plurality of requests Ri, the NRT-type requests Ri are transmitted by circuit 200 to device 1NRT where they are processed according to their priority levels pNRT as described in relation with FIG. 1, RT-type requests being transmitted by circuit 200 to device 1RT, where they are processed according to their priority levels pRT as described in relation with FIG. 1. Thus, when system 2 receives RT-type requests and NRT-type requests, device 1RT, respectively 1NRT, selects one of the RT-type, respectively NRT-type, requests. Arbitration circuit 210 then selects the RT-type request delivered by device 1RT rather than the NRT-type request delivered by device 1NRT.

Thus, as soon as the system receives at least one RT-type request, the system necessarily selects an RT-type request, despite the fact that the system has received NRT-type requests at the same time as the RT-type requests. This results from the fact that system 2 comprises a pathway, here device 1NRT, dedicated to NRT requests, and a pathway, here device 1RT, dedicated to RT requests, and that arbitration circuit 210 selects the second pathway as a priority.

Although this is not shown herein, circuit 200 and/or arbitration circuit 210 may comprise, like circuits 100RT, 100NRT and arbitration circuits 110jRT, 110jNRT, 120RT, and 120NRT, an input configured to receive a synchronization signal, for example, signal clk.

Further, although circuits 200, 100RT, and 100NRT have been shown herein in the form of three different circuits, circuit 200 may comprise circuit 100RT and/or circuit 100NRT. In the specific case where circuit 200 comprises the two circuits 100RT and 100NRT, the requests Ri received by circuit 200 are directly transmitted, by circuit 200, to arbitration circuits 110jNRT and 110jRT according to their RT or NRT types and to their priority levels pRT or pNRT.

Due to the fact that arbitration circuit 210 always selects the RT-type request when such a request is present on its input H, system 2 is adapted to the case where the RT type corresponds to requests requiring a real-time processing, and where the NRT type corresponds to requests which do not require a real-time processing.

Figure 3:
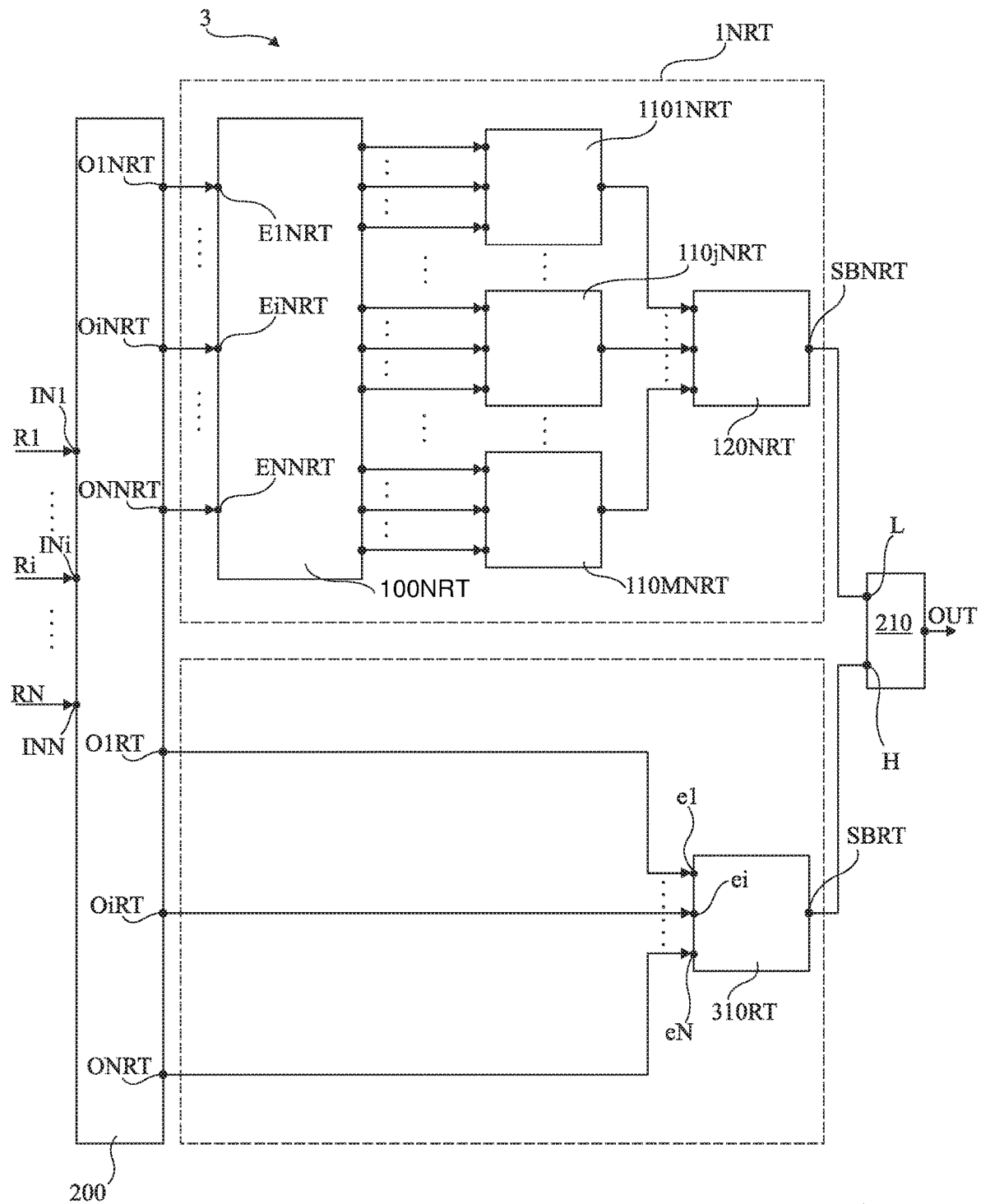
FIG. 3 schematically shows in the form of blocks another embodiment of a system comprising the device of FIG. 1.

FIG. 3 schematically shows in the form of blocks another embodiment of a system 3 comprising device 1 or FIG. 1 and more particularly, here, a single device 1.

System 3 may simultaneously receive up to N requests Ri. Each received request Ri may be of RT or NRT type. Further, each NRT-type request has a priority level pNRT, pNRT being an integer in the range from 1 to an integer MNRT greater than or equal to 2. However, conversely to the case of system 2, in system 3, RT-type requests do not have a priority level or, in other words, all have one and the same priority level pRT. Thus, no RT-type request has a higher priority than the other RT-type requests.

System 3 then differs from system 2 of FIG. 2 in that device 1RT is replaced by an arbitration circuit 310RT of round-robin type, arbitration circuit 310RT then corresponding to a pathway dedicated to the processing of RT-type requests. In the following, only the differences between systems 2 and 3 are detailed.

Arbitration circuit 310RT comprises N inputs ei, i being an integer in the range from 1 to N, to be able to simultaneously receive, if need be, N requests. Arbitration circuit 310RT comprises an output SBRT at the level of which the request selected by arbitration circuit 310RT is available, among the requests present on its inputs ei.

Further, input H of arbitration circuit 210 is here coupled, preferably connected, to output SBRT of arbitration circuit 310RT rather than to output SBRT as is the case in FIG. 2. Further, the N outputs OiRT of circuit 200 are respectively coupled, preferably connected, to the N inputs ei of arbitration circuit 310RT rather than to inputs EiRT of device 1RT as is in the case in FIG. 2.

The operation of system 3 is similar to the operation of system 2.

System 3 enables to process two types RT and NRT of requests, in the case where only NRT-type requests have a priority level which may be different between two requests of this type.

To treat this case, it could have been devised to generalize the description of device 1 made in relation with FIG. 1 in the case where number M of possible priority levels is equal to one, and to use the obtained device 1 instead of device 1RT of the system of FIG. 2. However, as compared with the described system 3, this would have resulted in a system 2 comprising an additional round-robin arbitration circuit 110RT and an additional circuit 100RT.

In the above-described embodiments, advantage is taken of the fact that a round-robin arbitration circuit does not create, by itself, a famine situation. Further, the taking into account of different priority levels between requests of a same type is implemented by means of circuits 100, 100RT, and 100NRT, since a round-robin arbitration circuit does not enable to take into account such priority levels. In other words, advantage is taken of the synergy between circuits 100, 100RT, and 100NRT which duplicate the requests that they receive according to their priority levels, and the round-robin arbitration circuits which equitably process the requests that they receive. This enables to decrease, or even to avoid, the risk of famine in the described devices and arbitration systems.

In the embodiments described hereabove in relation with FIGS. 2 and 3, it has been considered that the type and the priority level of a request are shown by two different pieces of information. However, it may be provided for a single piece of information to be representative of the priority level and of the type of a request. For example, it may be provided to the requests to each have a priority level k, k being in the range from 1 to MNRT+MRT, so that a request of priority level k in the range from 1 to MNRT corresponds, in the described embodiments, to a request of NRT type and of priority level pNRT=k, and that a request of priority level k in the range from MNRT+1 and MNRT+MRT corresponds, in the described embodiments, to a request of RT type and of priority level pRT=k-MNRT. It will be within the abilities of those skilled in the art, based on the functional indications given in the present disclosure, to adapt the described embodiments to the above case, and more generally to the various possible ways of representing the type and/or the priority level of a request.

Further, although two types, RT and NRT, of requests indicating whether a request should respectively be subject to a real-time processing have been described in relation with FIGS. 2 and 3, the two types of requests may represent other information. For example, the RT or NRT type of a request may indicate that the request is a request respectively in write mode or in read mode, read requests for example holding the priority over write requests.

The above described embodiments and variations may be provided in various electronic circuits such as microcontrollers, microprocessors, and direct memory access circuits (DMA). Further, a system 2 or 3 may be provided in a DMA circuit to implement an arbitration between requests, for example, requests of access to a bus, originating from the different channels of the DMA circuit. According to a specific example of implementation, a system 3 receiving the requests from a DMA circuit in the case where MNRT is equal to 3, N being for example equal to 4, is provided.

Various embodiments and variations have been described. It will be understood by those skilled in the art that certain features of these various embodiments and variations may be combined, and other variations will occur to those skilled in the art. In particular, the alternative embodiment described in relation with FIG. 1 (random selection of the p arbitration circuits) applies to the device 100NRT described in relation with FIGS. 2 and 3, as well as to the device 100RT described in relation with FIG. 2.

Finally, the practical implementation of the described embodiments and variations is within the abilities of those skilled in the art based on the functional indications given hereabove. In particular, although systems 2 and 3 configured to take into account two different types, NRT and RT, of requests have been described, it will be within the abilities of those skilled in the art to adapt systems 2 and 3 so that they take into account more than two different types of requests. For example, for each additional type of requests, a device 1 or a round-robin arbitration circuit is added to the system according to whether the requests of this additional type may or not have a plurality of priority levels, the number of inputs of fixed priority arbitration circuit 210, the number of outputs of circuit 200, and the operation of circuit 200 being accordingly adapted Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device, comprising:
a routing circuit configured to receive requests;
wherein, for each request, the priority level of the request is represented by an integer in the range from 1 to a number of possible priority levels for the requests, a value of said integer being higher as the priority of the request is higher;
a plurality of first round-robin arbitration circuits, wherein there are as many first round-robin arbitration circuits as there are the number of possible priority levels for the requests; and
wherein the routing circuit is configured to transmit each received request to a number of first round-robin arbitration circuits, said number of first round-robin arbitration circuits determined according to the priority level of said each request being transmitted.

2. The device of claim 1, wherein the number of first round-robin arbitration circuits to which the routing circuit transmits the request increases with increase in the priority level of the request.

3. The device of claim 1, wherein transmission by said routing circuit of the request is made to said number of first round-robin arbitration circuits which is equal to the integer representative of the priority level of the request.

4. The device of claim 1, wherein said routing circuit is further configured to randomly select, for each request, the first round-robin arbitration circuits of said plurality of first round-robin arbitration circuits to which the routing circuit transmits the request.

5. The device of claim 1, wherein each first round-robin arbitration circuit is associated with a respective priority level among the possible priority levels, and wherein transmission by the routing circuit comprises transmitting to the first round-robin arbitration circuit the request if the priority level of the request is greater than or equal to the priority level associated with the first round-robin arbitration circuit.

6. The device of claim 1, further comprising a second round-robin arbitration circuit having inputs respectively connected to the outputs of the first round-robin arbitration circuits.

7. The device of claim 6, further comprising:
a third round-robin arbitration circuit;
a fourth fixed priority arbitration circuit having a first input connected to an output of the second round-robin arbitration circuit and having a second input connected to an output of the third round-robin arbitration circuit; and
an input circuit configured to receive the requests, wherein each request further has a type selected among a first type and a second type, and transmit requests of the first type to the routing circuit and requests of the second type to said third round-robin arbitration circuit.

8. The device of claim 7, wherein the fourth fixed priority arbitration circuit is configured to select, when requests are present on each of the first and second inputs of the fourth fixed priority arbitration circuit, the request present on its second input.

9. The device of claim 7, wherein the number of possible priority levels for requests of the first type is different from the number of possible priority levels for requests of the second type.

10. The device of claim 7, wherein requests of the first type do not require a real-time processing, wherein requests of the second type require a real-time processing.

11. The device of claim 7, wherein the device is implemented by one of a microcontroller, a microprocessor, or a direct memory access circuit.

12. A system, comprising:
a first device;
a second device;
wherein each device of the first and second devices comprises:
a routing circuit configured to receive requests;
wherein, for each request, the priority level of the request is represented by an integer in the range from 1 to a number of possible priority levels for the requests, a value of said integer being higher as the priority of the request is higher;
a plurality of first round-robin arbitration circuits, wherein there are as many first round-robin arbitration circuits as there are the number of possible priority levels for the requests; and
a second round-robin arbitration circuit having inputs respectively connected to the outputs of the first round-robin arbitration circuits; and
wherein the routing circuit is configured to transmit each received request to a number of first round-robin arbitration circuits, said number of first round-robin arbitration circuits determined according to the priority level of said each request being transmitted;
a third fixed priority arbitration circuit having a first input connected to an output of the second round-robin arbitration circuit of said first device and having a second input connected to an output of the second round-robin arbitration circuit of said second device; and
an input circuit configured to receive the requests, wherein each request further has a type selected among a first type and a second type, and transmit requests of the first type to the routing circuit and requests of the second type to the routing circuit of said second device.

13. The system of claim 12, wherein the third fixed priority arbitration circuit is configured, when requests are present on each of the first and second inputs of the third fixed priority arbitration circuit, to select the request present on its second input.

14. The system of claim 12, wherein the number of possible priority levels for requests of the first type is different from the number of possible priority levels for requests of the second type.

15. The system of claim 12, wherein requests of the first type do not require a real-time processing, wherein requests of the second type require a real-time processing.

16. The system of claim 12, wherein the system is implemented by one of a microcontroller, a microprocessor, or a direct memory access circuit.

17. The system of claim 12, wherein for each device of the first and second devices the number of first round-robin arbitration circuits to which the routing circuit transmits each request increases with increase in the priority level of the request.

18. The system of claim 12, wherein for each device of the first and second devices transmission by said routing circuit of the request is made to said number of first round-robin arbitration circuits which is equal to the integer representative of the priority level of the request.

19. The system of claim 12, wherein for each device of the first and second devices said routing circuit is further configured to randomly select, for each request, the first round-robin arbitration circuits of said plurality of first round-robin arbitration circuits to which the routing circuit transmits the request.

20. The system of claim 12, wherein for each device of the first and second devices each first round-robin arbitration circuit is associated with a respective priority level among the possible priority levels, and wherein transmission by the routing circuit comprises transmitting to the first round-robin arbitration circuit the request if the priority level of the request is greater than or equal to the priority level associated with the first round-robin arbitration circuit.

21. A method, comprising:
receiving a plurality of requests having different priority levels; and
transmitting, by means of a routing circuit, the requests to first round-robin arbitration circuits;
wherein there are as many first round-robin arbitration circuits as there are possible priority levels for the received requests;
wherein transmitting by the routing circuit comprises:
determining a number representing the priority level of said each request; and
transmitting each received request to said determined number of first round-robin arbitration circuits.

22. The method of claim 21, wherein the determined number increases with increase in the priority level of the request.

* * * * *